(12) United States Patent
Hall

(10) Patent No.: US 6,652,933 B2
(45) Date of Patent: Nov. 25, 2003

(54) FLEXIBLE INSULATED POUCH

(75) Inventor: Christopher E. Hall, Sewickley, PA (US)

(73) Assignee: Alpine Packaging Group, Inc., Sewickley, PA (US)

(*) Notice: Subject to any disclaimer, the term of this patent is extended or adjusted under 35 U.S.C. 154(b) by 27 days.

(21) Appl. No.: 09/800,945

(22) Filed: Mar. 7, 2001

(65) Prior Publication Data

US 2001/0036520 A1 Nov. 1, 2001

Related U.S. Application Data

(60) Provisional application No. 60/189,794, filed on Mar. 16, 2000.

(51) Int. Cl.$^7$ .......................... B32B 1/02; B65D 30/08; B65D 81/38
(52) U.S. Cl. ................... 428/34.2; 428/35.2; 428/36.5; 383/110; 383/109; 383/105; 383/119; 383/38; 383/113
(58) Field of Search .................. 428/35.2, 36.5, 428/34.2, 113; 383/110, 109, 105, 119, 38

(56) References Cited

U.S. PATENT DOCUMENTS

| | | | | |
|---|---|---|---|---|
| 3,428,103 A | * | 2/1969 | Walsh | 150/2.2 |
| 3,460,740 A | * | 8/1969 | Hagen | 229/53 |
| 3,637,000 A | * | 1/1972 | Walger et al. | 150/3 |
| 4,104,404 A | * | 8/1978 | Bieler et al. | 428/35 |
| 4,193,499 A | * | 3/1980 | Lookholder | 206/524 |
| 4,210,686 A | * | 7/1980 | Gajewski et al. | 428/35 |
| 4,211,091 A | * | 7/1980 | Campbell | 62/372 |
| 4,343,158 A | * | 8/1982 | Campbell | 62/372 |
| 4,595,101 A | * | 6/1986 | Rivera | 206/542 |
| 4,620,633 A | * | 11/1986 | Lookholder | 206/523 |
| 4,925,512 A | * | 5/1990 | Briand | 156/201 |
| 5,046,621 A | * | 9/1991 | Bell | 206/627 |
| 5,150,971 A | * | 9/1992 | Strong et al. | 383/84 |
| 5,256,462 A | * | 10/1993 | Callahan et al. | 428/76 |
| 5,472,279 A | * | 12/1995 | Lin | 383/2 |

OTHER PUBLICATIONS

Xpander PAK, Inc., Xpander Home Page, Feb. 19, 2001, 1–2.

* cited by examiner

Primary Examiner—William P. Watkins, III
Assistant Examiner—Marc Patterson
(74) Attorney, Agent, or Firm—Paul A. Beck & Associates, P.C.

(57) ABSTRACT

A flexible insulated pouch. The flexible insulated pouch includes a pouch having multiple plies of closed cell polypropylene foam. The pouch is surrounded by a film bag made of material which acts as a moisture and oxygen barrier. The film bag is joined to one side of the pouch by a heat seal.

2 Claims, 5 Drawing Sheets

…

FLEXIBLE INSULATED POUCH

Figure 1:
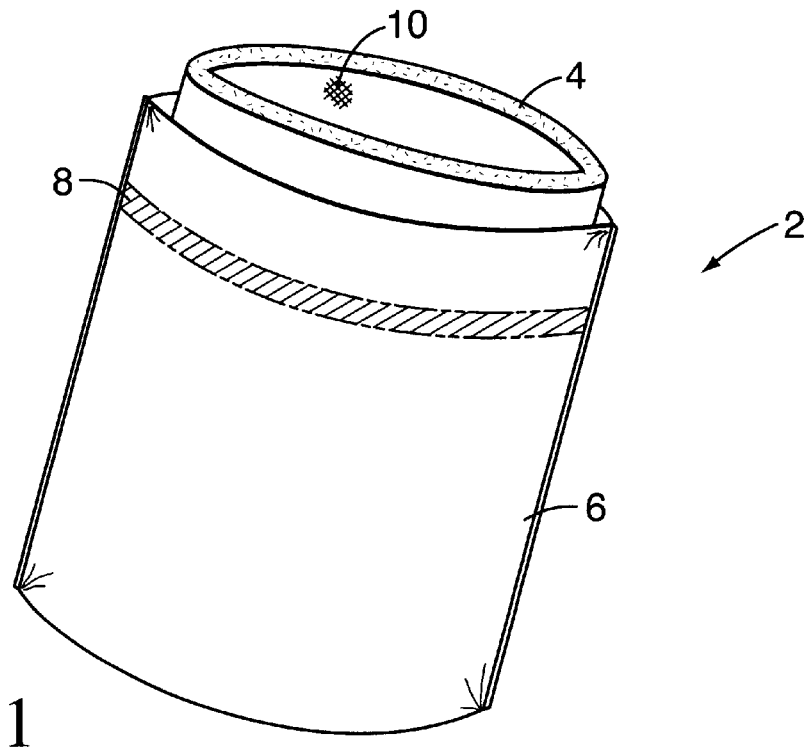

Applicant is claiming the benefit of the of the prior filed provisional application No. 60/189,794 filed on Mar. 16, 2000.

FIELD OF THE INVENTION

This invention relates generally to portable containers for temperature sensitive products and more particularly to a flexible insulated pouch used in shipping refrigerated and frozen pharmaceutical and food products. The apparatus provides temporary storage that allows refrigerated and frozen pharmaceutical and food products to be transported without spoilage.

Portable containers for temperature sensitive products have been commercially available for many years. One type of container available is a rigid, molded foam walled portable container. Because this type of container is constructed from Expanded Polystyrene and other resins it is prone to damage from impact during transportation and storage. Another disadvantage is that the container is rigid and does not allow for convenient storage and shipping due to space considerations.

Another type of portable container is a flexible portable container. Because the container is flexible it allows for convenient storage and shipping. However these flexible containers are disadvantaged by incorporating vacuum packed open celled foam panels that require the operator using the container to puncture each panel prior to shipment to release the vacuum seal. Consequently, the ability of such flexible containers to provide adequate insulation during transportation and temporary storage of refrigerated and frozen pharmaceutical and food products is directly related to the successful puncturing of these vacuum packed opened celled foam panels. Therefore, it is desirable to have a flexible portable container that does not require the operator to puncture the vacuum packed foam panels.

The present invention provides a protective, flexible, insulated structure for transportation and temporary storage of refrigerated and frozen pharmaceutical and food products without spoilage and without having to puncture vacuum packed foam panels. This is done by making a pouch that has multiple plies of closed cell polypropylene foam and a polypropylene film on the inside of the pouch that is enclosed in a film bag.

BACKGROUND OF THE INVENTION

There are various needs for portable containers for temperature sensitive products. Some of these needs include storage and shipping of food and pharmaceutical products. The present technology for shipping controlled temperature products is rigid foam coolers with refrigerant gel packs, bricks or sheets.

The rigid foam coolers provide adequate insulation for refrigeration however they don't provide an efficient means for transportation. The rigid foam is constructed from expanded polystyrene and other resins. This type of foam is crushable and prone to damage from impact during the transportation process. Additionally, because of the rigid design it is not practical in transportation because of space considerations.

Because the rigid foam coolers were inefficient in the transportation process flexible portable containers are being used.

One example of a flexible portable container is described in U.S. Pat. No. 4,620,633, Protective Envelope Device for Packaging Fragile Articles issued Nov. 4, 1986 to Lookholder. This device was originally designed for cushioning but it has been adapted to the insulated shipping application due to a product void in the market. It has an outer wall and an inner wall with a mass of compressed resilient open-celled cellular material enclosed in the space between the walls. In order for this device to work properly the operator is required to puncture the open celled foam panels prior to shipment to release the vacuum seal. The ability of this device to provide adequate insulation is directly related to the successful puncturing of the vacuum packed open celled foam panels. The success of this device is therefore subject to human error.

There is no known apparatus that provides an efficient means for transporting and temporary storage of refrigerated and frozen pharmaceutical and food products without the need for an operator to correctly puncture open celled foam panels. The present invention solves the problem by providing a flexible insulated pouch for transportation and temporary storage of refrigerated and frozen pharmaceutical and food products without spoilage thereof without the need to puncture the vacuum packed foam panels as described in U.S. Pat. No. 4,620,633.

SUMMARY OF THE INVENTION

The present invention provides a flexible insulated pouch. The apparatus has a pouch having multiple plies of closed cell polypropylene foam. A film bag made of material which acts as a moisture and oxygen barrier surrounds the pouch. A heat seal on the film bag joins the film bag to one side of the pouch. The present invention also provides for a flexible insulated pouch wherein the inside of the pouch can have a film on the inside. The film may be made of polypropylene or other material.

The present invention also provides for a flexible insulated pouch where the film bag is comprised of a polymer extrusion that is cooled into a sheet form of varying thickness.

The present invention also provides for a flexible insulated pouch that has a pouch that is a dual inner pouch that encapsulates two flexible panels of multiple plies of flexible insulated material. The multiple plies of flexible insulated material can be closed cell, flexible polypropylene foam or other flexible insulation material.

I provide a method to assemble the insulated foam pouch with a dual inner pouch by folding a flat sheet of heat-sealable film laminate in such a manner as to form a pouch with two pocket openings at a bottom side. The pouch is then heat sealed to form a permanent dual inner pouch structure containing two pockets with two openings at the bottom side. One flexible panel is placed into each pocket opening of the dual inner pouch. The dual inner pouch is then placed into the film bag so that the open end of the bottom side of the dual inner pouch is at a bottom closed end of the film bag. The film bag is heated by induction so that it is sealed to the dual inner pouch.

A BRIEF DESCRIPTION OF THE DRAWINGS

Figure 2:
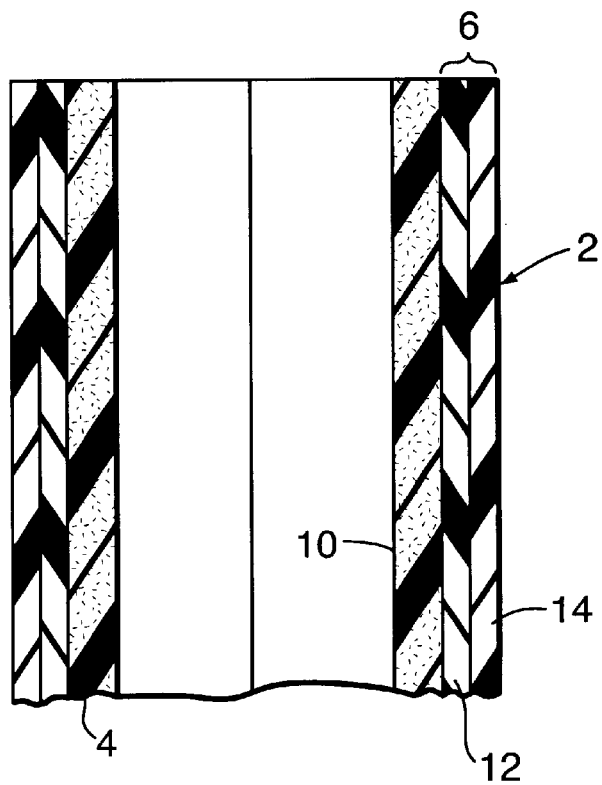
Figures 3, 4:
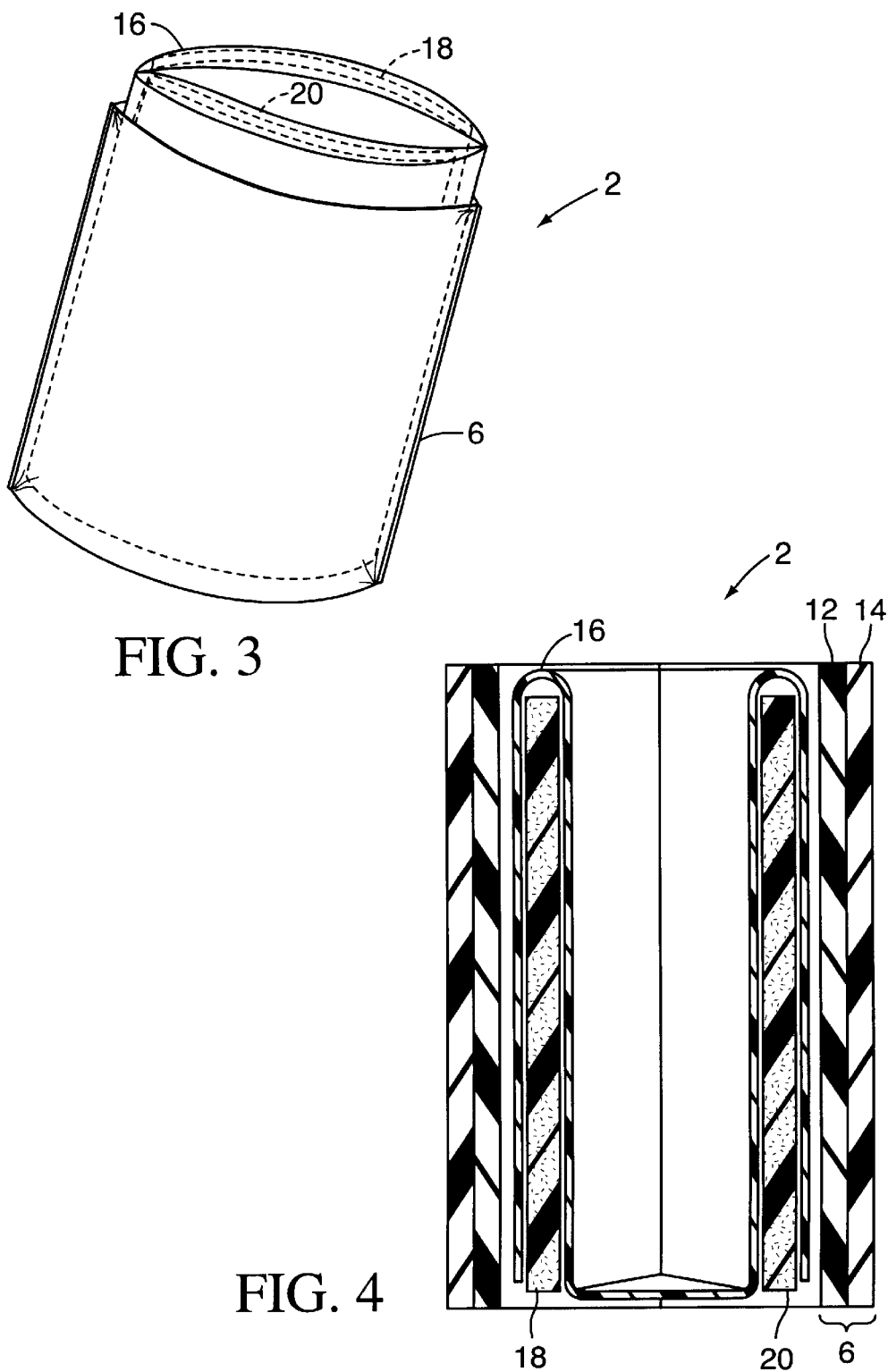
Figure 5:
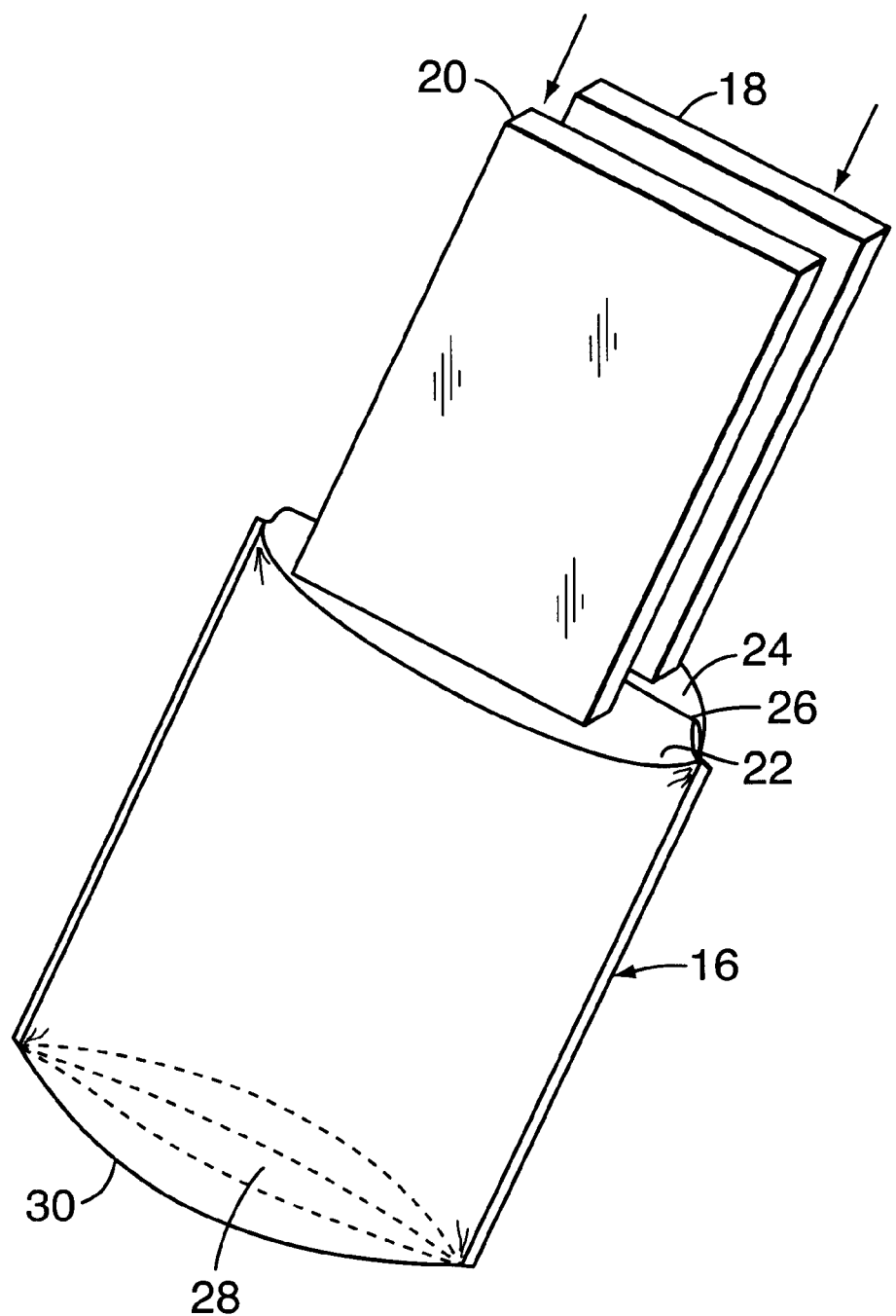
Figure 6:
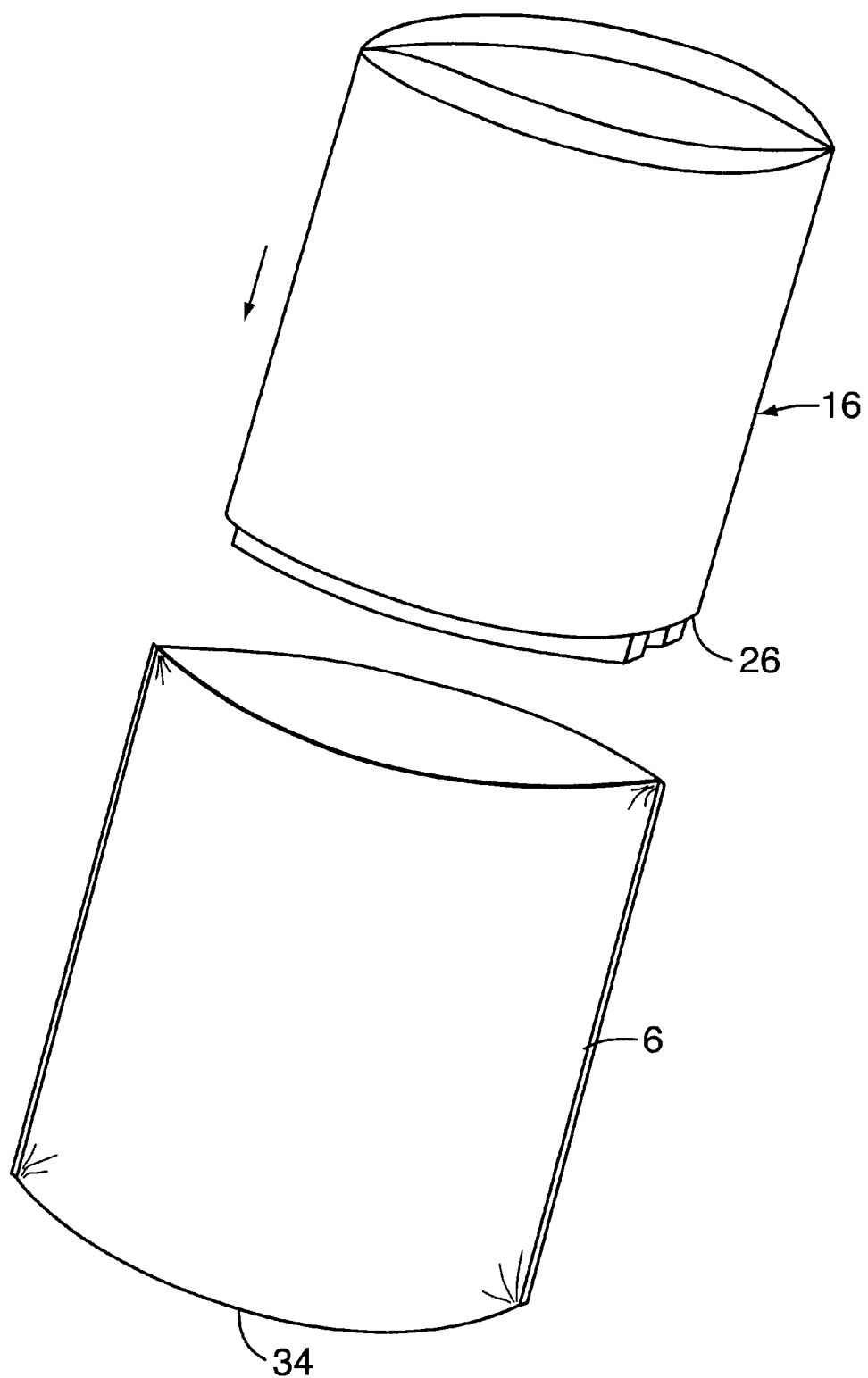
Figure 7:
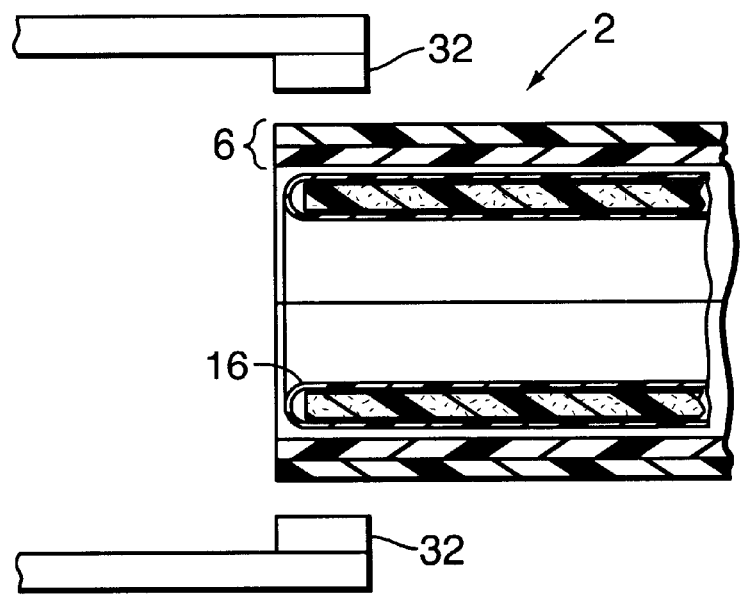
Figure 8:
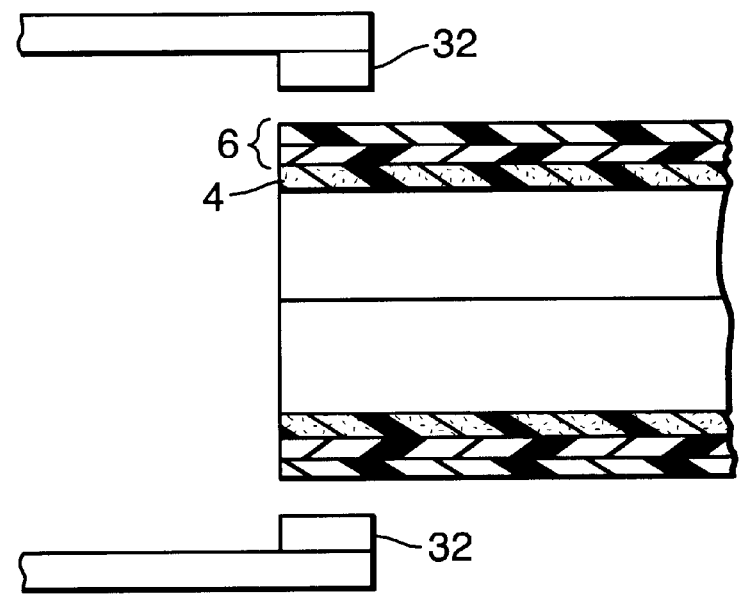

FIG. 1 Isometric view of the flexible insulated pouch;

FIG. 2 Side sectional view of the flexible insulated pouch;

FIG. 3 Isometric view of the flexible insulated pouch incorporating dual inner pouch and semi-rigid panels;

FIG. 4 Side sectional view of the flexible insulated pouch incorporating dual inner pouch;

FIG. 5 A side view in elevation of the dual inner pouch method of assembly;

FIG. 6 A side view in elevation of the insertion of dual inner pouch into the film bag;

FIG. 7 A sectional view of the induction heat seal process bonding the dual inner pouch;

FIG. 8 Sectional view of the induction heat seal process bonding the film bag and the foam pouch.

DETAILED DESCRIPTION OF A PREFERRED EMBODIMENT DEFINITIONS

1. Portable: An item that by virtue of its weight and/or exterior dimensions can be transported by a person without mechanical assistance.
2. Temperature Sensitive Products: Perishable products that must be maintained within a specified temperature range to avoid spoilage.
3. Insulated: With relation to a shipping container, the ability to minimize heat transfer during shipment and storage outside of a controlled temperature environment.
   Heat Transfer is discussed in more detail below:
   Heat can be transferred by three primary mechanisms:
   1. Radiation
   2. Convection
   3. Conduction
   Radiation is transmitted as electromagnetic waves, which cause heating, as they are absorbed.
   Convection heat transfer is caused by air movement across a surface of a material.
   Conduction heat transfer is governed by the density and thickness of the insulating material. All materials conduct heat at different rates. This rate of conduction is referred to as the K value for a given material.

$$K = \frac{BTU \times \text{Inches}}{Hrs. \times ft^2 \times F.°}$$

Where, BTU=British Thermal Unit
   Or, the amount of heat that passes through one square foot, 1 inch thick, of material in one hour for every degree temperature difference between both sides of the material. The more common term in relating to insulation is the R factor, which is a measure of the insulating quality of a material.

$$R = \frac{1}{K}$$

To keep a product cool a container that has a low "K" value should be selected. Similarly, high "R" values offer better insulation.
4. Flexible: Pliable, Not rigid.
5. Pouch: A flexible shipping and storage container manufactured from a poly, paper, or composite structure. Typically, one side of the pouch has an opening to allow for insertion and removal of the product and the other three sides are closed. Pouches can be flat or they can have gussets on one or more sides to provide additional interior storage volume.
6. Closed Cell: A cellular structure that provides for pockets of trapped air. Not open celled.
7. Polypropylene: A specific resin type used in the formulation of films and foams. Polypropylene is characterized by specific melting temperatures, barrier properties and other distinct physical properties.
8. Refrigerated: Temperature range from 33° F. to 50° F.
9. Frozen: Temperature below 32° F.
10. Rigid: Not pliable, not flexible.
11. Molded: Products that are formed using a combination of male and female dies, heat, and pressure.
12. Vacuum Packed: A manufacturing process that extracts oxygen and other gases from a closed environment.
13. Foam: Plastic foam material consists of a gas phase dispersed in a solid plastic phase and derives its properties from both. The solid plastic component forms the matrix. The gas phase is contained in voids or cells and is often referred to as the blowing or foaming agent.
14. Film: Polymer extrusion that is cooled into a sheet form of varying thicknesses
15. Multiple Plies: Individual layers of material substantially thinner in gauge than the overall gauge of the finished sheet. Each layer is attached to the other layer with heat and pressure to form a finished sheet.
16. Polypropylene Foam: A plastic foam material utilizing propylene resin as the solid plastic component.
17. Closed Cell Polypropylene Foam: A closed cell foam wherein each cell (more or less spherical in shape) is completely enclosed by a thin wall or membrane of plastic. See definition no. 16 for polypropylene foam.
18. Polypropylene Film: A plastic film material utilizing propylene resin as the solid plastic component.
19. Moisture Vapor Barrier (MVTR): The moisture permeability of a structure. The formula for measurement of a Moisture Barrier is outlined below:

$$MVTR = \text{Grams } H20/100 \text{ } Sq. \text{ } In./24 \text{ } Hrs$$

The higher the MVTR measurement, the greater the amount of moisture vapor that can pass through 100 sq. in. of the structure in 24 hrs.
20. Oxygen Barrier (OTR): The oxygen permeability of a structure.

$$OTR = \text{Cubic Centimeters } O^2/100 \text{ } Sq. \text{ } In./24 \text{ } Hrs$$

The higher the OTR measurement, the greater the amount of oxygen that can pass through 100 sq. in. of the structure in 24 hours.
21. Induction Heating: A mechanical device that conducts heat. When used in the assembly process of the invention, the induction heating is in the form of a "jaw" which lightly compresses finished film on exterior of both the flexible insulated pouch and the dual poach and through the application of heat bonds the foam pouch to the film bag.

Description

FIG. 1 shows a flexible insulated pouch 2. The flexible insulated pouch 2 is comprised of a foam pouch 4 having multiple plies of closed cell polypropylene foam. Surrounding the pouch 4 is a film bag 6. The film bag 6 is made of material that acts as a moisture vapor barrier and an oxygen barrier. A heat seal 8 joins the pouch 4 to the film bag 6. The pouch 4 can have a film 10 on the inside.

FIG. 2 shows a side section view of a flexible insulated pouch 2, a film bag 6, and a pouch 4. The film bag 12 is comprised of a polymer extrusion that is cooled into a sheet form of varying structure. The polymer extrusion can be a laminated film structure or a non-laminated film structure. If the film bag 6 is comprised of a laminated film structure, one laminate 12 is comprised of a linear low-density polyethylene or low-density polypropylene (preferable 1.0–40 mil thickness). The second laminate 14 is comprised of metallized or non-metallized polyester (preferable 48–60 gauge thickness. If this laminate is metallized it will be coated with an additional 4–12 micron thickness metallizing.) The two laminates 12 and 14 are extruded to form a finished film. If the film bag 6 is comprised of a non-laminated film structure, the entire film bag 6 would be comprised of an extruded sheet of linear low density polyethylene, low density polypropylene or other low or high density resin. The pouch 4 may have a film 10 on the inside. The film 10 may be comprised of polypropylene.

FIG. 3 shows a flexible insulated pouch 2 comprised of a film bag 6 surrounding a dual inner pouch 16. The dual inner pouch 16 contains two flexible panels 18 and 20 one on each side of the dual inner pouch 16. The two flexible panels 18 and 20 are comprised of flexible insulation material.

FIG. 4 shows a sectional view of a flexible insulated pouch 2 with a dual inner pouch 16. A laminated film bag 6 is depicted but a non-laminated film bag 6 may be used as described in FIG. 2. One laminate 12 and a second laminate 14 comprise the film bag 6. The dual inner pouch 16 is encapsulating two flexible panels 18 and 20 one on each side of the flexible insulated pouch 2. The two flexible panels 18 and 20 are comprised of multiple plies of closed cell, flexible polypropylene foam or other flexible insulation material. Preferably the flexible panels 18 and 20 are comprised of multiple plies of closed cell, flexible polypropylene (⅛–2 inch thickness).

FIG. 5. shows the assembly of a dual inner pouch 16. The dual inner pouch 16 is comprised of a heat-sealable film. A flat sheet of the heat-sealable film is folded and heat sealed in such a manner as to form two pocket openings 22 and 24 each at the bottom side 26 of the dual inner pouch 16 and a dual insulated pouch opening 28 at the top side 30 of the dual inner pouch 16. The flexible panels 18 and 20 are die cut or sheeted to a rectangular panel of predetermined length and width. The flexible panels 18 and 20 are then inserted into the two pocket openings 22 and 24 at the bottom side 26 of the pouch dual inner pouch 16.

FIG. 6. shows the dual inner pouch 16 being inserted into the film bag 6 with the bottom side 26 of the dual inner pouch 16 at the closed end 34 of the film bag 6. The film bag 6 is sealed to the dual inner pouch 16 by induction heating 32 shown in FIG. 7.

FIG. 7. is a side sectional view of the flexible insulated pouch 2 with a dual inner pouch 16 surrounded by a film bag 6. A heat sealing device 32 is used to join the dual inner pouch 16 to the film bag 6.

FIG. 8 is a side sectional view of the flexible insulated pouch 2 with a pouch 4 surrounded by a film bag 6. A heat sealing device 32 is used to join the pouch 4 to the film bag 6.

As various changes could be made in the above construction and method without departing from the scope of the invention, it is intended that all matter contained in the above description as shown in the accompanying drawings shall be interpreted as illustrative and not as a limitation.

I claim:

1. A flexible insulated pouch comprising:

(a) a bag formed of film in which the film acts as a moisture and oxygen barrier, the bag has a bottom closed end;

(b) a dual inner pouch having a bottom side and a top side and formed of heat-sealable film and folded in such a manner to form two pockets with openings at the bottom side of the dual inner pouch, the dual inner pouch has an opening at the top side, the dual inner pouch within the bag and attached to the bag by a heat seal, the two pocket openings at the bottom side of the dual inner pouch adjacent to the bottom closed end of the bag; and (c) a panel of flexible insulation material within each of the pockets of the dual inner pouch.

2. A flexible insulated pouch as recited in claim 1 wherein the panel comprises multiple plies of closed cell flexible polypropylene foam.

* * * * *

UNITED STATES PATENT AND TRADEMARK OFFICE
CERTIFICATE OF CORRECTION

PATENT NO. : 6,652,933 B2  Page 1 of 1
DATED : November 25, 2003
INVENTOR(S) : Christopher E. Hall It is certified that error appears in the above-identified patent and that said Letters Patent is hereby corrected as shown below:

Column 1,
Line 1, cancel beginning with "the benefit of the of the prior filed provisional" and insert the following: -- the benefit of the prior filed provisional --.

Column 3,
Line 34, cancel beginning with "K = BTUxInches" and insert the following:
-- K = BTUxInches --.
Line 36, cancel the beginning with "Hrs.xft2xF.°" and insert the following:
-- Hrs.xft2xF° --.
Line 66, cancel beginning with "33° F. to 50° F." and insert the following:
-- 33° F to 50° F. --.

Column 4,
Line 12, cancel beginning with "of varying thicknesses" and insert the following:
-- of varying thicknesses. --.
Line 46, cancel beginning with "insulated pouch and the dual poach" and insert the following: -- insulated pouch and the dual pouch --.
Line 65, cancel beginning with "(preferable 1.0-40 mil thickness)." and insert the following: -- (preferable 1.0-4.0 mil thickness). --.

Column 5,
Line 27, cancel beginning with "FIG. 5." and insert the following: -- FIG. 5 --.

Signed and Sealed this

Eleventh Day of May, 2004

JON W. DUDAS
*Acting Director of the United States Patent and Trademark Office*